US010926808B2

(12) United States Patent
Horvat et al.

(10) Patent No.: US 10,926,808 B2
(45) Date of Patent: Feb. 23, 2021

(54) STRUCTURAL COMPONENT FOR A MOTOR VEHICLE

(71) Applicant: Bayerische Motoren Werke Aktiengesellschaft, Munich (DE)

(72) Inventors: Daniela Horvat, Landshut (DE); Florian Spirkl, Bodenkirchen (DE); Mathias Hofmann, Munich (DE); Michael Kleinknecht, Munich (DE); Bernhard Staudt, Munich (DE); Thomas Miadowitz, Ergolding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/974,832

(22) Filed: May 9, 2018

(65) Prior Publication Data
US 2018/0257717 A1 Sep. 13, 2018

Related U.S. Application Data

(63) Continuation of application No. PCT/EP2016/070925, filed on Sep. 6, 2016.

(30) Foreign Application Priority Data

Nov. 10, 2015 (DE) .................. 10 2015 222 055

(51) Int. Cl.
*B62D 25/00* (2006.01)
*B62D 25/20* (2006.01)
(Continued)

(52) U.S. Cl.
CPC ......... *B62D 25/2036* (2013.01); *B62D 21/00* (2013.01); *B62D 25/00* (2013.01);
(Continued)

(58) Field of Classification Search
CPC .. B62D 25/2036; B62D 29/046; B62D 29/04; B62D 29/043; B62D 29/001;
(Continued)

(56) References Cited

U.S. PATENT DOCUMENTS 8,511,743 B2 * 8/2013 Kraushaar .............. B62D 21/15
296/187.02
9,022,458 B2 * 5/2015 Hasegawa ............ B62D 29/043
296/191

(Continued)

FOREIGN PATENT DOCUMENTS

CN 102159442 A 8/2011
DE 10 2009 007 122 A1 8/2010
(Continued)

OTHER PUBLICATIONS

International Search Report (PCT/ISA/210) issued in PCT Application No. PCT/EP2016/070925 dated Nov. 22, 2016 with English translation (seven pages).

(Continued)

*Primary Examiner* — Dennis H Pedder
(74) *Attorney, Agent, or Firm* — Crowell & Moring LLP

(57) ABSTRACT

A structural component for a motor vehicle is provided. The structural component includes a closed hollow profile including fiber composite material, with a profile outer casing surrounding a profile volume. The structural component also includes at least one reinforcing bulkhead which is arranged in the profile volume on at least one section of an inner casing surface of the profile outer casing. The height of the at least one reinforcing bulkhead, perpendicularly from the inner casing surface, in at least one position in which the at least one reinforcing bulkhead is arranged on the inner casing surface, is lower than a passage height of the profile volume in this position.

18 Claims, 5 Drawing Sheets

(51) Int. Cl.
    *B62D 29/00*    (2006.01)
    *B62D 21/00*    (2006.01)
    *B62D 29/04*    (2006.01)
    *B60R 19/18*    (2006.01)

(52) U.S. Cl.
    CPC ........... *B62D 29/004* (2013.01); *B62D 29/04* (2013.01); *B60R 2019/1853* (2013.01); *B62D 29/043* (2013.01); *B62D 29/046* (2013.01)

(58) Field of Classification Search
    CPC .... B62D 29/002; B62D 29/041; B62D 21/00; B62D 25/00
    USPC ..... 296/203.01–203.04, 205, 187.01, 187.02
    See application file for complete search history.

(56) References Cited

U.S. PATENT DOCUMENTS

| | | | |
|---|---|---|---|
| 2004/0256889 A1* | 12/2004 | Schonebeck | B29C 33/16 296/187.02 |
| 2006/0152041 A1* | 7/2006 | Igarashi | B62D 29/002 296/187.02 |
| 2011/0274910 A1 | 11/2011 | Kraushaar | |
| 2011/0298243 A1 | 12/2011 | Auer | |
| 2012/0074735 A1* | 3/2012 | Engertsberger | B62D 21/157 296/203.03 |
| 2016/0059893 A1 | 3/2016 | Fodor | |

FOREIGN PATENT DOCUMENTS

| | | |
|---|---|---|
| DE | 10 2009 051 460 A1 | 5/2011 |
| DE | 10 2010 037 459 A1 | 3/2012 |
| DE | 10 2011 000 450 A1 | 8/2012 |
| DE | 10 2012 011 860 A1 | 12/2012 |
| DE | 10 2011 115 855 A1 | 4/2013 |
| DE | 10 2011 087 497 A1 | 6/2013 |
| DE | 10 2013 208 265 A1 | 11/2014 |
| DE | 10 2013 222 016 A1 | 12/2014 |
| JP | 7-132860 A | 5/1995 |
| JP | 2002-274427 A | 9/2002 |
| WO | WO 2014/018848 A1 | 1/2014 |

OTHER PUBLICATIONS

German-language Written Opinion (PCT/ISA/237) issued in PCT Application No. PCT/EP2016/070925 dated Nov. 22, 2016 (five pages).

German-language Search Report issued in counterpart German Application No. 10 2015 222 055.9 dated Sep. 28, 2016 with partial English translation (12 pages).

Chinese-language Office Action issued in counterpart Chinese Application No. 201680041952.5 dated Jul. 2, 2019 with English translation (17 pages).

\* cited by examiner

STRUCTURAL COMPONENT FOR A MOTOR VEHICLE

CROSS REFERENCE TO RELATED APPLICATIONS

This application is a continuation of PCT International Application No. PCT/EP2016/070925, filed Sep. 6, 2016, which claims priority under 35 U.S.C. § 119 from German Patent Application No. 10 2015 222 055.9, filed Nov. 10, 2015, the entire disclosures of which are herein expressly incorporated by reference.

BACKGROUND AND SUMMARY OF THE INVENTION

The present invention relates to a structural component for a motor vehicle, having a hollow profile made of fiber composite material with a profile casing which surrounds a profile volume, and at least one reinforcing bulkhead which is arranged in the profile volume on at least one portion of the inner lateral surface of the profile casing.

In the prior art, body structures which are produced by way of sheet metal monocoque construction are known. Here, all load introduction elements can be integrated comparatively easily, since the components are open and thus accessible. For weight reduction, body structures are being produced increasingly frequently using fiber reinforced plastic materials. Here, work is primarily carried out using RTM and wet pressing components of monocoque construction. The scrap that arises during production is a considerable cost driver in this case. In order to reduce this, braided profiles are intended to be used. Braided profiles cause little scrap and are highly rigid while having a correspondingly low weight. However, since hollow profiles are no longer available after braiding, cast nodes or pressed nodes are subsequently affixed from the outside. A further load introduction possibility can be generated by perforating the profile and inserting metal connecting elements.

WO 2014/018848 A1 discloses a structural component having a device for laminating a force introduction point into a fiber composite component, wherein the device includes a sleeve with a firmly attached base plate. DE 10 2012 011 860 A1 furthermore discloses a structural component with a main component formed from fiber reinforced plastic material, wherein the main component is formed with a connecting element braced therein.

In all variants of structural components that are known from the prior art, downstream process steps such as milling, drilling or adhesive bonding and also screwing, curing and/or cooling operations are inevitable. Moreover, the mechanical stability in particular in the case of monocoque components is not optimal and the space requirement is large.

An object of the present invention is to at least partially remedy the above-described drawbacks in structural components for motor vehicles. In particular, an object of the present invention is to provide a structural component for a motor vehicle that is easy to produce, has a reduced weight and is as strong and/or rigid as possible.

This and other objects are achieved by a structural component for a motor vehicle in accordance with embodiments of the present invention.

According to an embodiment of the present invention, a structural component for a motor vehicle is provided, having a closed hollow profile made of fiber composite material with a profile casing which surrounds a profile volume, and at least one reinforcing bulkhead which is arranged in the profile volume on at least one portion of the inner lateral surface of the profile casing. According to the embodiment of the invention, the at least one reinforcing bulkhead has, at at least one point at which the at least one reinforcing bulkhead is arranged on the inner lateral surface, and has a height, starting perpendicularly from the inner lateral surface, which is less than a passage height of the profile volume at this point.

This means that the structural component according to the embodiment of the invention has at least one reinforcing bulkhead which, at the at least one point, does not extend over the entire height of the closed hollow profile, or is arranged only in the region of for example three or fewer side faces of the inner lateral surface. In other words, at at least one point at which the reinforcing bulkhead is arranged on the inner lateral surface of the profile volume, the reinforcing bulkhead has a height, starting perpendicularly from the inner lateral surface, which, orthogonally to a passage direction of the closed hollow profile in a region in the profile volume in which the reinforcing bulkhead is arranged, is less than a passage height of the profile region in this region. This means that the at least one reinforcing bulkhead is not formed all the way round the inner lateral surface of the profile casing. Since the at least one reinforcing bulkhead does not extend over the entire passage height of the profile volume at the at least one point, an excellent space and weight saving can be achieved with regard to the structural profile.

The height of the at least one reinforcing bulkhead at the at least one point is preferably much less than the passage height, for example less than 80%, particularly preferably less than 50% of the passage height of the profile volume at this point. Depending on the reinforcement to be achieved by the at least one reinforcing bulkhead, the height at the at least one point in this region can also be much less than 50% of the passage height of the profile volume.

It may also be advantageous for the at least one reinforcing bulkhead to not have a height which corresponds to the passage height of the profile volume at any point. This means that the at least one reinforcing bulkhead can have a height, or a maximum height, at every point, which is less than the passage height of the profile volume. As a result, a particularly advantageous space and weight saving can be achieved. The maximum height of the at least one reinforcing bulkhead can preferably be less than 80%, particularly preferably less than 60% of the passage height of the profile volume in the region of the at least one reinforcing bulkhead.

The height at the point at which the at least one reinforcing bulkhead is arranged on the inner lateral surface should be understood as meaning a height, the extent of which starting from the inner lateral surface of the profile casing extends parallel to the passage height of the profile volume. The height at this point should be understood as meaning the entire height of the at least one reinforcing bulkhead, including material interruptions.

The structural component according to an embodiment of the invention is preferably produced by way of a braiding method. In this case, an inflatable core, or a blow core, for example, is arranged in its reduced-volume and thus evacuated form on the reinforcing bulkhead. Subsequently, the blow core can attain its final and maximum volume extent by being inflated. This form can also be created in a constructive manner, for example by using rapid prototyping methods to build up grains of sand or salt or other materials in layers. A semi-finished product produced in this way can then be introduced into the braiding process. Once the braiding process has been completed, the blow core can be emptied again and returned to its reduced-volume form.

Since the at least one reinforcing bulkhead has a height at the at least one point that is less than a passage height of the profile volume at this point, an above-described blow core can be removed or extracted from the structural component in a particularly easy manner after the end of a braiding process.

Within the meaning of the present invention, a reinforcing bulkhead is a geometric construction which forms a reinforcing element in the closed hollow profile in order to accordingly improve force transmission and force application for the closed hollow profile. In the present case, a closed hollow profile should be understood as being a hollow profile which forms a circumferentially closed profile casing portion at least in the region of the at least one reinforcing bulkhead. The end faces of the closed hollow profile do not have to be closed. The closed hollow profile should be distinguished in particular from non-closed hollow profiles, which are produced for example in monocoque construction or have a C-shaped or substantially C-shaped profile casing in section. A closed hollow profile should be understood as being for example tubular or substantially tubular profile which is, of course, not limited to a particular geometric cross-sectional shape.

The at least one reinforcing bulkhead is preferably arranged in a load introduction region in the closed hollow profile. For particularly high strength and/or rigidity, the at least one reinforcing bulkhead exhibits or is produced from preferably metal or a metal alloy of steel, stainless steel and/or aluminum. The at least one reinforcing bulkhead can alternatively or additionally also be produced from injection-molded thermoplastic. This results in a further weight reduction of the structural component according to the embodiment of the invention.

It may furthermore be advantageous when, in the case of a milled reinforcing bulkhead, a protrusion protrudes from an outer lateral surface of the at least one reinforcing bulkhead. This protrusion can be braided around without further measures and serve as a positioning element for further processing on the finished structural component. In this case, the protrusion should be or is braided around such that it is not covered by the braided structure or projects out of the latter.

Furthermore, it may be advantageous when the at least one reinforcing bulkhead has a rib structure or rib geometry. As a result, a further increase in strength and/or rigidity of the structural component together with a reduced overall weight can be achieved. In order to prevent unintended tearing of the blow core during the above-described production of the structural component, it may be of further advantage not to form the rib structure of the at least one reinforcing bulkhead directly on the outer side of the at least one reinforcing bulkhead or to cover the rib structure in a corresponding manner by way of a covering element in particular with respect to the blow core. Alternatively, it is also contemplated to form the rib structure in a correspondingly blunt manner, for example with a corresponding radius at the ribs.

For the precise geometric design of the at least one reinforcing bulkhead, the finding, made in the context of the present invention, that, upon loading of the structural component, the load curve runs from the closed hollow profile via the at least one reinforcing bulkhead and back into the closed hollow profile, should be taken as a basis.

According to one development of the present invention, it is possible for the at least one reinforcing bulkhead to be formed in a substantially triangular, trapezoidal or funnel-shaped manner in side view. The at least one reinforcing bulkhead is preferably formed such that the central region of the at least one reinforcing bulkhead has as much material as possible, i.e., preferably the longest edge of the reinforcing bulkhead formed in a triangular, trapezoidal or funnel-shaped manner is arranged at or adjoins the inner lateral surface of the profile casing. As a result, load introduction at this point of the structural component can be supported in a particularly advantageous manner.

It is also possible for the at least one reinforcing bulkhead to have, in a peripheral region in which the at least one reinforcing bulkhead is arranged on the inner lateral surface, a peripheral height, starting perpendicularly from the inner lateral surface, which is less than 50%, preferably less than 30%, particularly preferably less than 20% of the maximum height of the at least one reinforcing bulkhead. As a result of the flat runout in the peripheral region of the at least one reinforcing bulkhead, failure-critical tension peaks that occur particularly in the peripheral region can be minimized.

Furthermore, it is possible according to an embodiment of the invention for the at least one reinforcing bulkhead to be fastened to the inner lateral surface of the profile casing by way of an adhesive bond or a materially integral connection. As a result, the at least one reinforcing bulkhead is arranged in a particularly space-saving manner in the profile volume of the structural component. Load transmission takes place in this case in principle only via the adhesive bond between the inner lateral surface of the profile casing and the at least one reinforcing bulkhead, or the corresponding connecting surfaces. The adhesive bond is preferably generated during the infiltration of the closed hollow profile. It is possible to dispense with additional screw connections or the like in the process.

Furthermore, it may be advantageous according to an embodiment of the invention for the at least one reinforcing bulkhead to be arranged in a form-fitting manner on the inner lateral surface of the profile casing. Preferably, to this end, the at least one reinforcing bulkhead has, at at least one point at which the at least one reinforcing bulkhead is arranged on the inner lateral surface, a height, starting perpendicularly from the inner lateral surface, which corresponds to the passage height of the profile volume at this point. To this end, the at least one reinforcing bulkhead is arranged for example at least partially on two opposite sides of the inner lateral surface. According to the embodiment of the invention, it is also sufficient, in this regard, for the at least one reinforcing bulkhead to be correspondingly supported partly on the inner lateral surface of the profile casing. In particular in the case of closed hollow profiles that have five or more edges or are tubular, the at least one reinforcing bulkhead does not have to extend over the entire passage height and can nevertheless be arranged in a form-fitting manner on the inner lateral surface of the profile casing. As a result of the form fit according to the embodiment of the invention, increased security or a greater transmissible load can be achieved at the corresponding point of the structural component.

It is also possible for a coupling device, in particular having a through-opening, to be formed in or on the at least one reinforcing bulkhead. The structural component can be coupled to an external device by way of said coupling device. A coupling device directly on the at least one reinforcing bulkhead allows a particularly secure coupling possibility for external devices. The coupling device is preferably configured with a through-opening, which is preferably in the form of a thread or threaded bore. However, the coupling device can also have a protrusion, in particular with a latching means or an external thread. The coupling device preferably has a socket with which an external device is able to be coupled, i.e., to be coupled in a form- or force-fitting manner. For coupling to the external device, it is advantageous for the coupling device to extend through the lateral surface of the closed hollow profile. This can be realized for example by a corresponding braiding process, although it should be ensured that the fiber composite material displaced during braiding does not protrude beyond the surface of the coupling device. This means that the surface of the coupling element is located preferably at the same height as or higher than the surface or the outer surface of the fiber composite material of the closed hollow profile. As a result, corrosion protection with respect to the highly corrosive carbon fiber composite material can be achieved. Alternatively, the access to the coupling device can also be realized by subsequent boring open of the profile casing at the location of the coupling device, or corresponding exposure of the coupling device at this point.

According to one development of the present invention, in the region of the coupling device, an intermediate element may be arranged between the at least one reinforcing bulkhead and the inner lateral surface. This intermediate element exhibits or includes corrosion-resistant material, with the result that corresponding corrosion protection can be ensured. If, as mentioned above, the profile casing is exposed at the location of the coupling device, the use of the corrosion-resistant intermediate element according to the embodiment of the invention is of particular advantage. The intermediate element is formed in a manner corresponding to the geometric configuration of the coupling element. If the coupling element has for example a thread, the intermediate element is preferably formed as an annular disk which is preferably pressed into the at least one reinforcing bulkhead. To be more precise, the intermediate element is pressed into or mounted in the at least one reinforcing bulkhead in this case such that it is arranged at least partly between the at least one reinforcing bulkhead and the inner lateral surface of the profile casing.

It is also possible for the at least one reinforcing bulkhead to be formed in a continuous manner in a surface region which is not connected to the inner lateral surface. Within the meaning of the present invention, formed in a continuous manner should be understood as meaning formed without edges. This should preferably be realized by a monolithic configuration of the at least one reinforcing bulkhead. Since the at least one reinforcing bulkhead is formed in a continuous manner in the surface region which is not connected to the inner lateral surface, unintended tearing of a blow core during production of the structural component as described above can be avoided.

Moreover, it may be advantageous in the context of the present invention for at least one breaking edge, at which a blow core, which is movable relative to the at least one reinforcing bulkhead and in contact with the latter, is able to be ruptured in a targeted manner, to be formed on the at least one reinforcing bulkhead. As a result, it is possible to create a predetermined breaking point for a blow core, which tears, for example, into two separate blow-core halves, when it is pulled out of the closed hollow profile. This can make it easier to pull the blow core out and can thus result in easier production of the structural component.

Furthermore, it is possible according to an embodiment of the invention for the profile volume to be foam-filled in the region of the at least one reinforcing bulkhead, preferably only in the region of the at least one reinforcing bulkhead.

As a result of the foam filling and in particular as a result of the local foam filling in the region of the at least one reinforcing bulkhead, increased local component rigidity and/or strength can be achieved with little additional weight. The region of the at least one reinforcing bulkhead should be understood as being a region, in particular a limited region of the profile volume, in which the at least one reinforcing bulkhead is arranged.

Further measures that improve the invention can be gathered from the following description of various exemplary embodiments of the invention, which are illustrated schematically in the figures. All features and/or advantages that can be gathered from the claims, the description or the drawing, including structural details and spatial arrangements, can be essential to the invention both individually and in the various combinations.

DETAILED DESCRIPTION OF THE DRAWINGS

Elements with an identical function and mode of action are each provided with the same reference signs in FIGS. 1 to 10.

Figure 1:
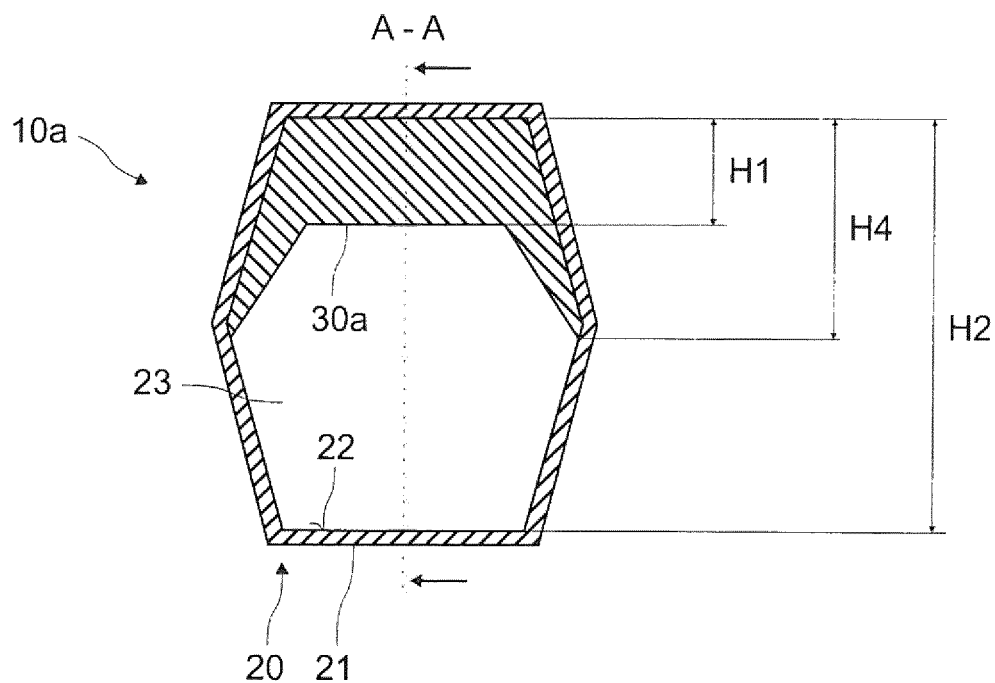
FIG. 1 is a schematic view of a structural component in a sectional front view according to a first embodiment of the present invention.

FIG. 1 schematically illustrates a structural component 10a for a motor vehicle according to a first embodiment of the invention. The structural component 10a has a closed hollow profile 20 made of fiber composite material with a hexagonal profile casing 21. The profile casing 21 surrounds a profile volume 23 and has an inner lateral surface 22. Arranged on a portion of the inner lateral surface 22 of the profile casing 21 and thus in the profile volume 23 is a reinforcing bulkhead 30a.

The reinforcing bulkhead 30a illustrated according to FIG. 1 has, at a point or in a central region at which or in which the reinforcing bulkhead 30a is arranged on the inner lateral surface 22, a height H1, starting perpendicularly from the inner lateral surface 22, which is much less than a passage height H2 (a height orthogonal to the passage direction D) of the profile volume 23 at this point. In an outer region, the reinforcing bulkhead 30a according to FIG. 1 has its maximum height H4. In this region, the reinforcing bulkhead 30a is arranged or supported in a form-fitting manner on the inner lateral surface 22 of the profile casing 21. Here, the reinforcing bulkhead 30a is U- or V-shaped or substantially U- or V-shaped in section.

In this case, the illustrated reinforcing bulkhead 30a does not, as illustrated in FIG. 1, have to extend across the entire width of the profile volume 23. Thus, the reinforcing bulkhead 30a can be arranged for example only on one or two of the six side faces of the inner lateral surface 22.

Figure 2:
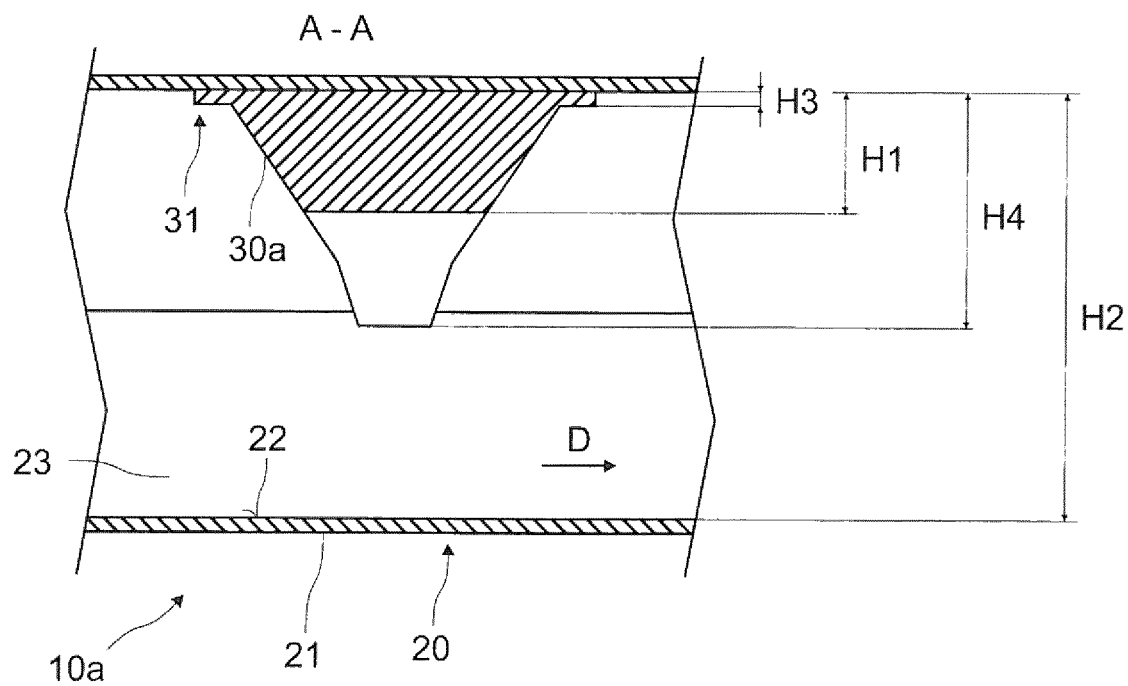
FIG. 2 is a schematic view of the structural component in a sectional side view according to the first embodiment of the present invention.

FIG. 2 shows a side view of the structural component 10a according to the first embodiment in a section along the line A-A in FIG. 1. As can be seen in FIG. 2, the reinforcing bulkhead 30a is formed in a substantially funnel-shaped manner in side view. In a peripheral region 31 of the reinforcing bulkhead 30a, in which the reinforcing bulkhead 30a is arranged on the inner lateral surface 22, the reinforcing bulkhead 30a has a height H3, starting perpendicularly from the inner lateral surface 22, which is much less than the maximum height H4 of the reinforcing bulkhead 30a.

The reinforcing bulkhead 30a illustrated in FIGS. 1 and 2 is fastened to the inner lateral surface 22 of the profile casing 21 by way of adhesive bonding.

Figure 3:
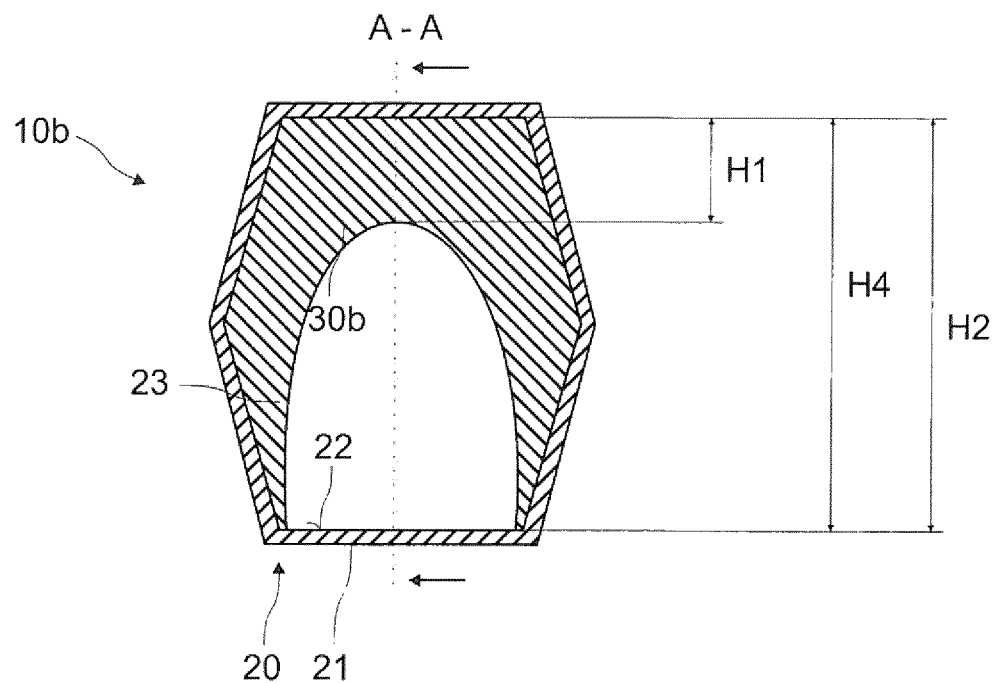
FIG. 3 is a schematic view of a structural component in a sectional front view according to a second embodiment of the present invention.
Figure 4:
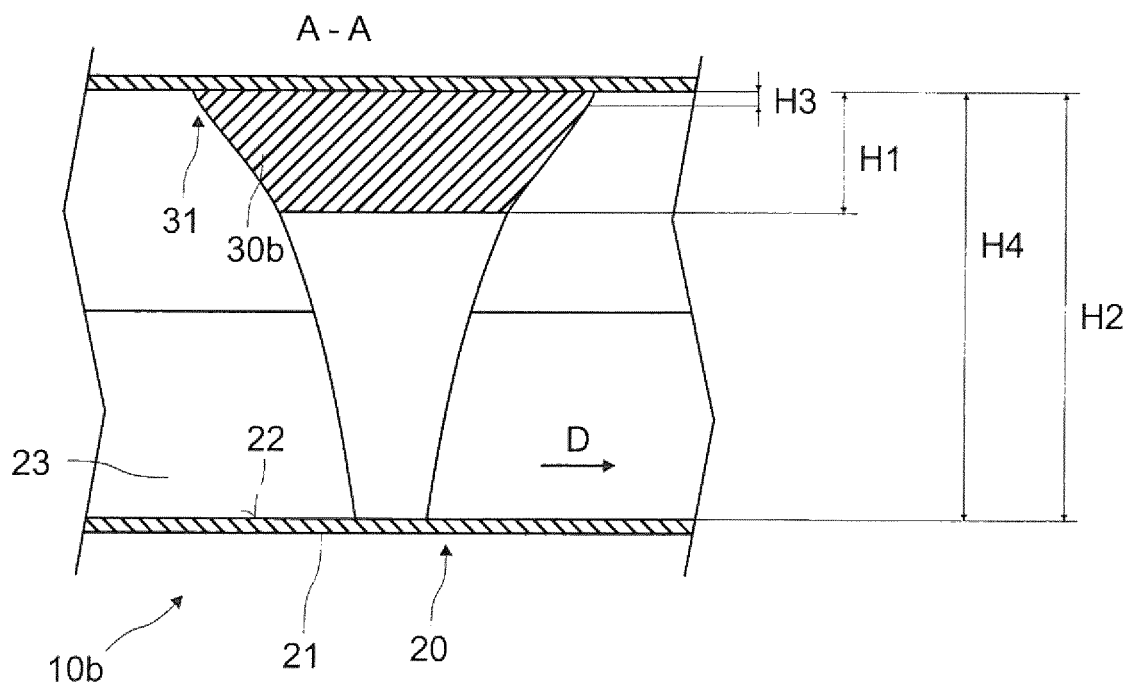
FIG. 4 is a schematic view of the structural component in a sectional side view according to the second embodiment of the present invention.

With regard to FIG. 3 and FIG. 4, a second embodiment of the present invention is now described. FIG. 3 and FIG. 4 show a structural component 10b which is similar to the structural component 10a illustrated in FIG. 1 and FIG. 2. The structural component 10b according to the second embodiment differs from the structural component 10a of the first embodiment in particular in that the reinforcing bulkhead 10b is formed continuously, i.e., without edges, in a surface region which is not connected to the inner lateral surface 22.

Figure 5:
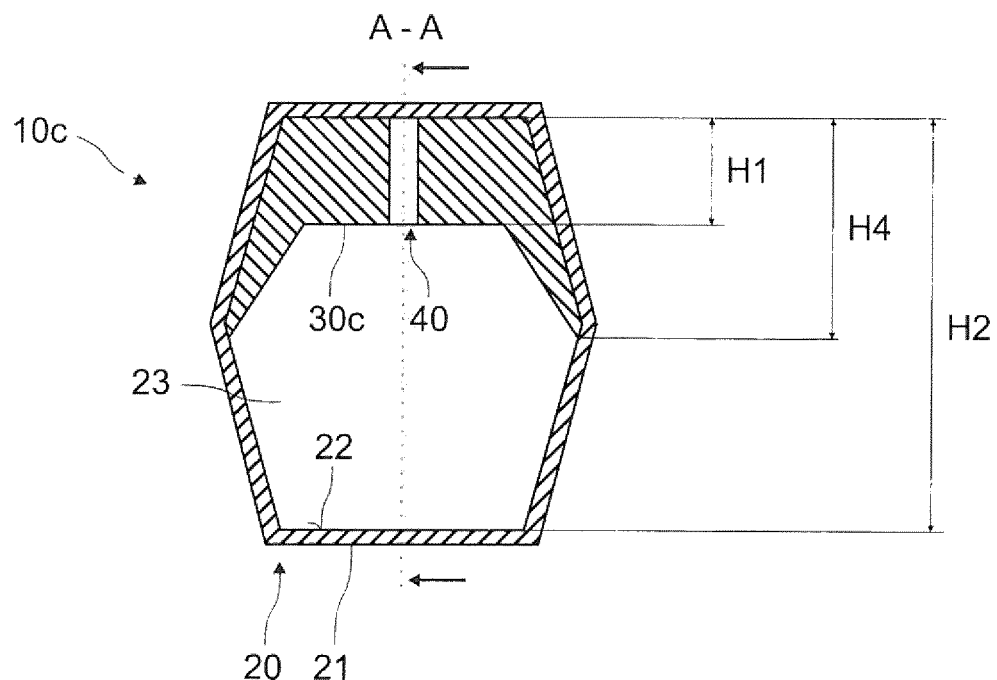
FIG. 5 is a schematic view of a structural component in a sectional front view according to a third embodiment of the present invention.
Figure 6:
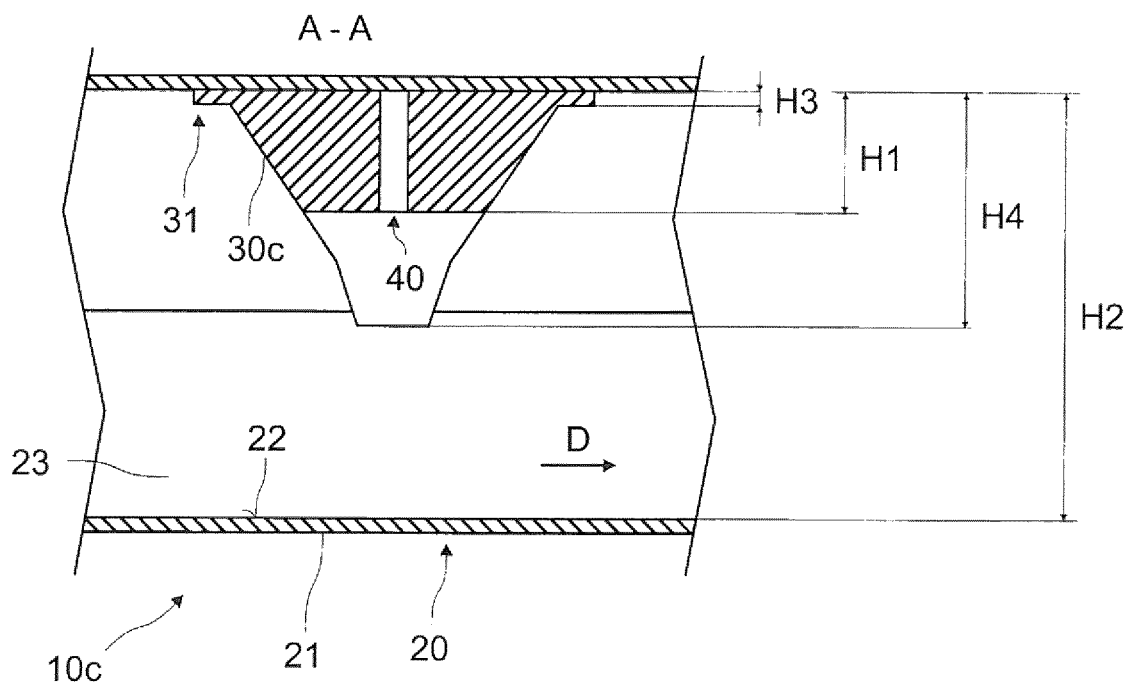
FIG. 6 is a schematic view of the structural component in a sectional side view according to the third embodiment of the present invention.

FIG. 5 and FIG. 6 illustrate a structural component 10c according to a third embodiment. The structural component 10c illustrated in FIG. 5 and FIG. 6 is distinguished in particular by the fact that a coupling device 40 in the form of a through-opening is formed in the reinforcing bulkhead 30c, wherein the through-opening preferably has a thread. By way of this coupling device 40, the structural component 10c, or the reinforcing bulkhead 30c, is able to be coupled to an external device. The external device can be an axle carrier, a link, a door connection or a similar device for a motor vehicle. In order to connect the external device to the structural component 10c or the reinforcing bulkhead 30c, the profile casing 21 is open on the side of the coupling device 40.

Figure 7:
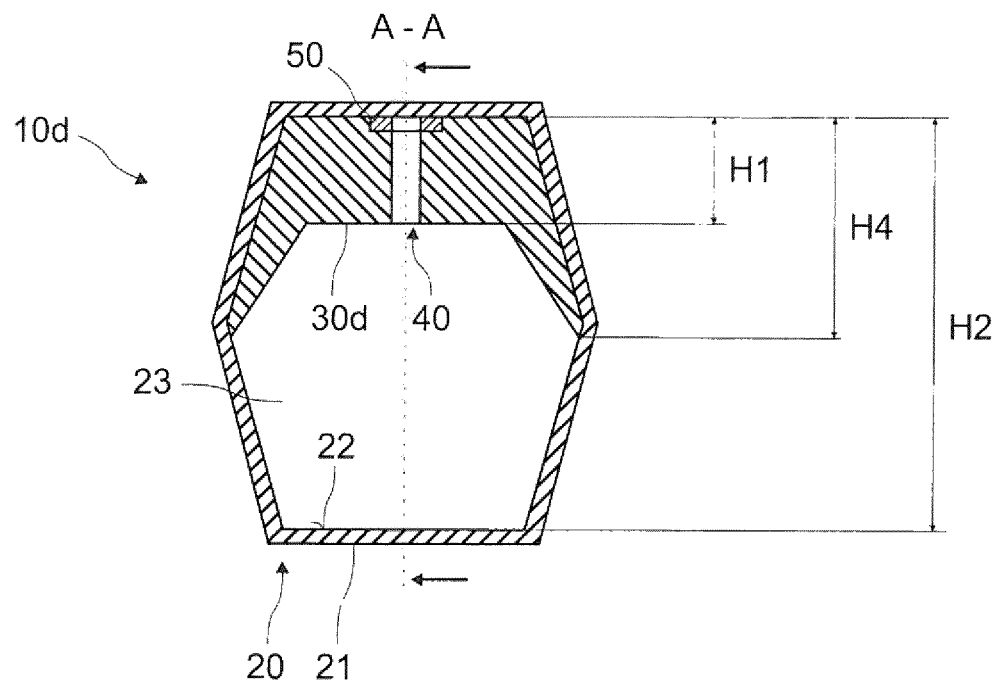
FIG. 7 is a schematic view of a structural component in a sectional front view according to a fourth embodiment of the present invention.
Figure 8:
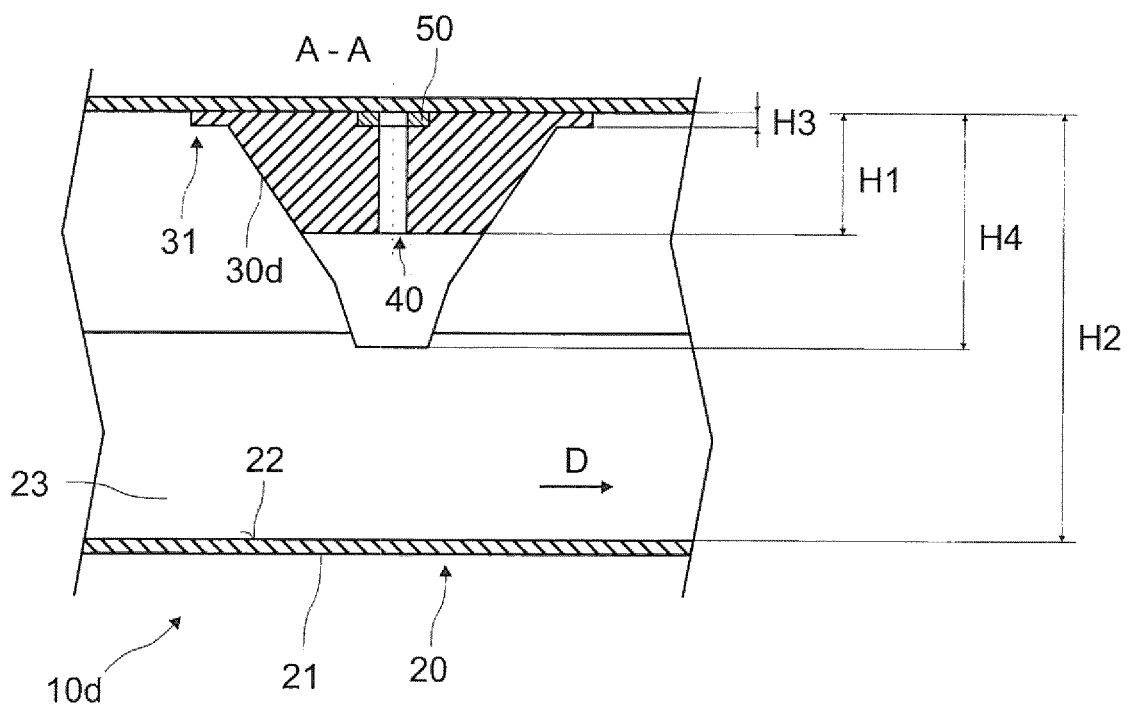
FIG. 8 is a schematic view of the structural component in a sectional side view according to the fourth embodiment of the present invention.

The structural component 10d, illustrated in FIG. 7 and FIG. 8, according to a fourth embodiment of the present invention is distinguished in particular by the intermediate element 50 which is arranged in the region of the coupling device 40 between the reinforcing bulkhead 30d and the inner lateral surface 22. The intermediate element 50 is, according to FIG. 7 and FIG. 8, an annular disk made of corrosion-resistant material such as aluminum or stainless steel, which is pressed into the reinforcing bulkhead 30d or is placed in a corresponding recess therein.

Figure 9:
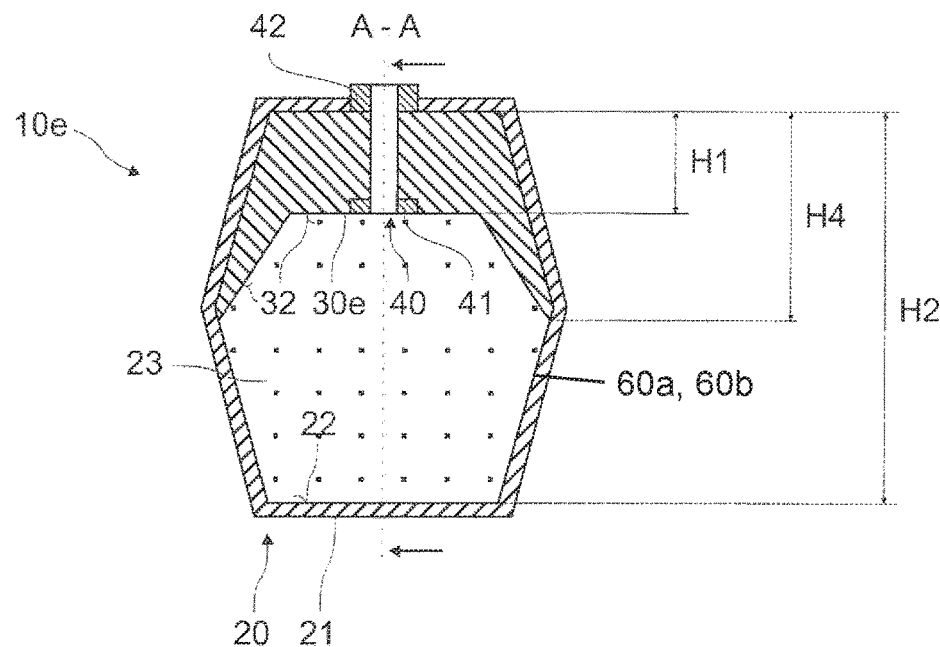
FIG. 9 is a schematic view of a structural component in a sectional front view according to a fifth embodiment of the present invention.
Figure 10:
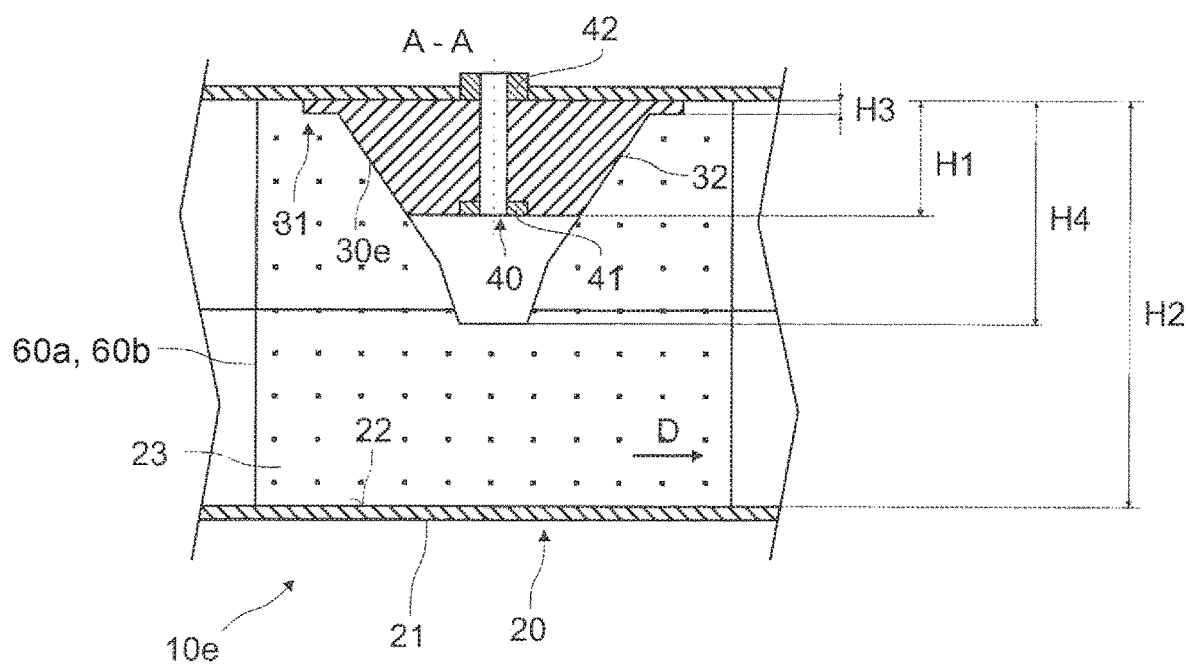
FIG. 10 is a schematic view of the structural component in a sectional side view according to the fifth embodiment of the present invention.

FIG. 9 and FIG. 10 show a structural component 10e according to a fifth embodiment of the present invention. Formed on the reinforcing bulkhead 30e according to the fifth embodiment are a plurality of breaking edges 32, at which an inflated blow core 60a, which is movable relative to the reinforcing bulkhead 30e and in contact with the latter, is able to be ruptured in a targeted manner. Furthermore, in FIG. 9 and FIG. 10, a foamed-filled region 60b is in the profile volume 23 in the region of the reinforcing bulkhead 30e.

According to the fifth embodiment, the coupling device 40 is configured in the form of a sleeve with a thrust bearing 41 and a protrusion 42. As a result of the thrust bearing 41, the coupling device 40 can be held better in the reinforcing bulkhead 30e under load or load introduction. The protrusion 42 passes through the profile casing 21 according to FIG. 9 and FIG. 10 such that it projects beyond the outer surface of the profile mantel 21, or of the hollow profile 20. In spite of the through-opening in the profile casing 21, the hollow profile 20 should be understood, in the context of the present invention, as being a closed or at least as a substantially closed hollow profile.

LIST OF REFERENCE SIGNS

10 Structural component
20 Closed hollow profile
21 Profile casing
22 Inner lateral surface
23 Profile volume
30 Reinforcing bulkhead
31 Peripheral region
32 Breaking edge
40 Coupling means
41 Thrust bearing
42 Protrusion
50 Intermediate element
60 Foam-filled region
H1 Height of the reinforcing bulkhead
H2 Passage height of the profile volume
H3 Peripheral height
H4 Maximum height of the reinforcing bulkhead The features illustrated with respect to the various embodiments are, of course, not limited to the respective embodiments. Rather, features which have been described with respect to one embodiment may also be the subject of another embodiment. Since modifications of the disclosed embodiments incorporating the spirit and substance of the invention may occur to persons skilled in the art, the invention should be construed to include everything within the scope of the appended claims and equivalents thereof.

What is claimed is:

1. A structural component for a motor vehicle, comprising:
    a closed hollow profile made of fiber composite material with a profile casing which surrounds a profile volume; and
    at least one reinforcing bulkhead arranged in the profile volume on at least one portion of an inner surface of the profile casing, so as to contact the inner surface at a first point and at a second point outward-lateral to the first point,
    wherein a height of the reinforcing bulkhead, as measured perpendicular to the inner surface from the first point is less than a passage height of the profile volume at the first point,
    wherein a maximum height of the reinforcing bulkhead, as measured perpendicular to the inner surface from the second point is greater than the height of the reinforcing bulkhead, and wherein the at least one reinforcing bulkhead is formed in a substantially triangular, trapezoidal or funnel-shaped manner in side view.

2. The structural component according to claim 1, wherein the at least one reinforcing bulkhead has, in a peripheral region in which the at least one reinforcing bulkhead is arranged on the inner surface, a peripheral height, starting perpendicularly from the inner surface, which is less than 50% of the maximum height of the at least one reinforcing bulkhead.

3. The structural component according to claim 2, wherein the peripheral height is less than 20% of the maximum height of the at least one reinforcing bulkhead.

4. The structural component according to claim 1, wherein the at least one reinforcing bulkhead is fastened to the inner surface of the profile casing by way of an adhesive bond.

5. The structural component according to claim 3, wherein the at least one reinforcing bulkhead is fastened to the inner surface of the profile casing by way of an adhesive bond.

6. The structural component according to claim 1, wherein the at least one reinforcing bulkhead is arranged in a form-fitting manner on the inner surface of the profile casing.

7. The structural component according to claim 5, wherein the at least one reinforcing bulkhead is arranged in a form-fitting manner on the inner surface of the profile casing.

8. The structural component according to claim 1, wherein a coupling device is formed in or on the at least one reinforcing bulkhead, the structural component being couplable to an external device by way of the coupling device.

9. The structural component according to claim 8, wherein the coupling device has a through-opening.

10. The structural component according to claim 8, wherein
in a region of the coupling device, an intermediate element is arranged between the at least one reinforcing bulkhead and the inner surface, and
the intermediate element has corrosion-resistant material.

11. The structural component according to claim 9, wherein
in a region of the coupling device, an intermediate element is arranged between the at least one reinforcing bulkhead and the inner surface, and
the intermediate element has corrosion-resistant material.

12. The structural component according to claim 1, wherein the at least one reinforcing bulkhead is formed in a continuous manner in a surface region which is not connected to the inner surface.

13. The structural component according to claim 11, wherein the at least one reinforcing bulkhead is formed in a continuous manner in a surface region which is not connected to the inner surface.

14. The structural component according to claim 1, wherein at least one breaking edge, at which a blow core, which is movable relative to the at least one reinforcing bulkhead and in contact with the latter, is rupturable in a targeted manner, is formed on the at least one reinforcing bulkhead.

15. The structural component according to claim 13, wherein at least one breaking edge, at which a blow core, which is movable relative to the at least one reinforcing bulkhead and in contact with the latter, is rupturable in a targeted manner, is formed on the at least one reinforcing bulkhead.

16. The structural component according to claim 1, wherein the profile volume is foam-filled in a region of the at least one reinforcing bulkhead.

17. The structural component according to claim 15, wherein the profile volume is foam-filled in a region of the at least one reinforcing bulkhead.

18. The structural component according to claim 17, wherein the profile volume is foam-filled only in the region of the at least one reinforcing bulkhead.

* * * * *